United States Patent
Ide

(10) Patent No.: US 7,602,098 B2
(45) Date of Patent: Oct. 13, 2009

(54) METHOD FOR DRIVING ION CONDUCTING ACTUATOR AND ION CONDUCTING ACTUATOR

(75) Inventor: Takayuki Ide, Fussa (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/805,333

(22) Filed: May 23, 2007

(65) Prior Publication Data

US 2007/0290574 A1 Dec. 20, 2007

(30) Foreign Application Priority Data

May 26, 2006 (JP) .............................. 2006-146762

(51) Int. Cl.
*H01L 41/00* (2006.01)
(52) U.S. Cl. .................. 310/311; 310/300; 310/330
(58) Field of Classification Search ................. 310/300, 310/311, 330
See application file for complete search history.

(56) References Cited

U.S. PATENT DOCUMENTS

| | | | |
|---|---|---|---|
| 5,268,082 A | | 12/1993 | Oguro et al. |
| 2002/0039620 A1 | | 4/2002 | Shahinpoor et al. |
| 2004/0242709 A1 | * | 12/2004 | Oguro et al. ................. 521/27 |
| 2005/0200984 A1 | * | 9/2005 | Browne et al. .............. 359/846 |
| 2006/0257645 A1 | * | 11/2006 | Asaka et al. ................ 428/323 |
| 2007/0114116 A1 | * | 5/2007 | Nagai et al. ................. 200/181 |
| 2007/0209915 A1 | * | 9/2007 | Takagi et al. ................ 200/181 |

FOREIGN PATENT DOCUMENTS

| | | | |
|---|---|---|---|
| EP | 1 693 950 A1 | | 8/2006 |
| JP | 6-235376 | * | 8/1994 |
| JP | 08-019276 | * | 1/1996 |
| JP | 2002-330598 | * | 11/2002 |
| JP | 2004-282992 | | 10/2004 |
| JP | 2005-039995 | * | 2/2005 |
| JP | 2006-295999 | * | 10/2006 |
| WO | WO 97/26039 | | 7/1997 |
| WO | WO 2005/057772 A1 | | 6/2005 |

* cited by examiner

*Primary Examiner*—Thomas M Dougherty
(74) *Attorney, Agent, or Firm*—Scully, Scott, Murphy & Presser, P.C.

(57) ABSTRACT

An ion conducting actuator includes a substrate which is made of a polymer material, and facing electrodes for generating an electric field. In the ion conducting actuator, a shape of the substrate is deformed to a desired shape by distributing unevenly ions and/or polar molecules in the substrate by applying a voltage between the facing electrodes. A deformation state is formed by a shape-maintained time $t_2$ for which the shape of the substrate is maintained substantially, and a deformation-start time $t_1$ which is before the shape-maintained time $t_2$, and during which, the shape of the substrate is deformed from an arbitrary shape to a desired shape. A drive voltage V applied to the ion conducting actuator differs during the shape-maintained time $t_2$, and during the deformation-start time $t_1$.

7 Claims, 9 Drawing Sheets

AMOUNT OF DISPLACEMENT d

METHOD FOR DRIVING ION CONDUCTING ACTUATOR AND ION CONDUCTING ACTUATOR

CROSS-REFERENCE TO RELATED APPLICATION

The present application is based upon and claims the benefit of priority from the prior Japanese Patent Application No. 2006-146762 filed on May 26, 2006; the entire contents of which are incorporated herein by reference.

BACKGROUND OF THE INVENTION

1. Field of the Invention

The present invention relates to a method for driving an ion conducting actuator, and an ion conducting actuator.

2. Description of the Related Art

In recent years, in fields such as medical equipments, industrial robots, and micro machines, research and development of actuators in which various principles of operation are applied have been carried out. Among these, an ion conducting actuator in which, an electrode is formed on a surface of an ion-exchange resin in a form in which polar molecules such as an ion fluid are included, and is deformed by bending by applying a voltage has been called as an artificial muscle for its flexible driving mode. The artificial muscle is expected to have applications in various fields from now onward. For example, in Japanese Patent Application Laid-open Publication No. 2004-282992, examples of structures of various ion conducting actuators have been disclosed.

However, in Japanese Patent Application Laid-open Publication No. 2004-282992, only a relationship of a deformation shape with respect to a drive voltage applied has been described. Therefore, in this patent literature, there has been no disclosure at all regarding a time for which the drive voltage is applied and the deformation shape.

For an actuator, not only the drive mode but also factors related to time such as a deformation speed and a response speed, become important factors. Therefore, when the actuator is driven substantially by a method described in Japanese Patent Application Laid-open Publication No. 2004-282992, an operation speed being slow, applications are restricted.

SUMMARY OF THE INVENTION

The present invention is made in view of the abovementioned problems, and an object of the present invention is to provide a method for driving an ion conducting actuator which can achieve a high-speed response, and an ion conducting actuator which can be driven at a high speed by this method.

For solving the abovementioned issues and achieving the object, according to a first aspect of the present invention, there can be provided a method for driving an ion conducting actuator which includes a substrate made of a polymer material containing ions and/or polar molecules which are movable according to an electric field, and facing electrodes for generating the electric field, on a surface of the substrate, and which deform a shape of the substrate to a desired shape by distributing unevenly the ions or the polar molecules in the substrate by applying a voltage to the facing electrodes, and maintains a deformed shape of the substrate for a predetermined time, including applying to the ion conducting actuator a drive voltage which differs during a shape-maintained time (period) and during a deformation-start time (period). The shape-maintained time for which a shape of the substrate is maintained substantially and the deformation-start time which is before the shape-maintained time, and during which the shape of the substrate is deformed from an arbitrary shape to a desired shape, together form a deformation state of the ion conducting actuator.

According to a preferable aspect of the present invention, it is desirable that the drive voltage applied during the shape-maintained time is a voltage which supplies an energy equivalent to an energy required for holding a distribution of the ions or the polar molecules which substantially maintain the deformed shape of the substrate.

According to another preferable aspect of the present invention, it is desirable that the drive voltage applied during the shape-maintained time decreases gradually along with time.

According still another preferable aspect of the present invention, it is desirable that the drive voltage applied during the shape-maintained time decreases in stages, along with time.

According to still another preferable aspect of the present invention, it is desirable that at least a part of the drive voltage applied during the deformation-start time is higher than a standard voltage.

According to still another preferable aspect of the present invention, it is desirable that the drive voltage applied during the deformation-start time is not constant.

According to still another preferable aspect of the present invention, it is desirable that the drive voltage applied during the deformation-start time is constant.

According to a second aspect of the present invention, there can be provided an ion conducting actuator comprises a substrate made of a polymer material containing ions and/or polar molecules which are movable according to an electric field; and facing electrodes which generates the electric field, on a surface of the substrate, wherein a shape of the substrate is deformed to a desired shape by distributing unevenly the ions or the polar molecules in the substrate, by applying a voltage between the facing electrodes, and maintains substantially a deformed state of the substrate for a predetermined time, and a shape-maintained time for which the shape of the substrate is maintained substantially and a deformation-start time which is before the shape-maintained time, and during which, the shape of the substrate is deformed from an arbitrary shape to a desired shape, together form a deformation state of the ion conducting actuator, and a drive voltage which differs during the shape-maintained time and the deformation-start time is applied to the ion conducting actuator.

DETAILED DESCRIPTION OF THE INVENTION

Embodiments of a method for driving an ion conducting actuator according to the present invention, and the ion conducting actuator will be described below in detail by referring to the accompanying diagrams. However, the present invention is not restricted by these embodiments.

First Embodiment

Figure 1:
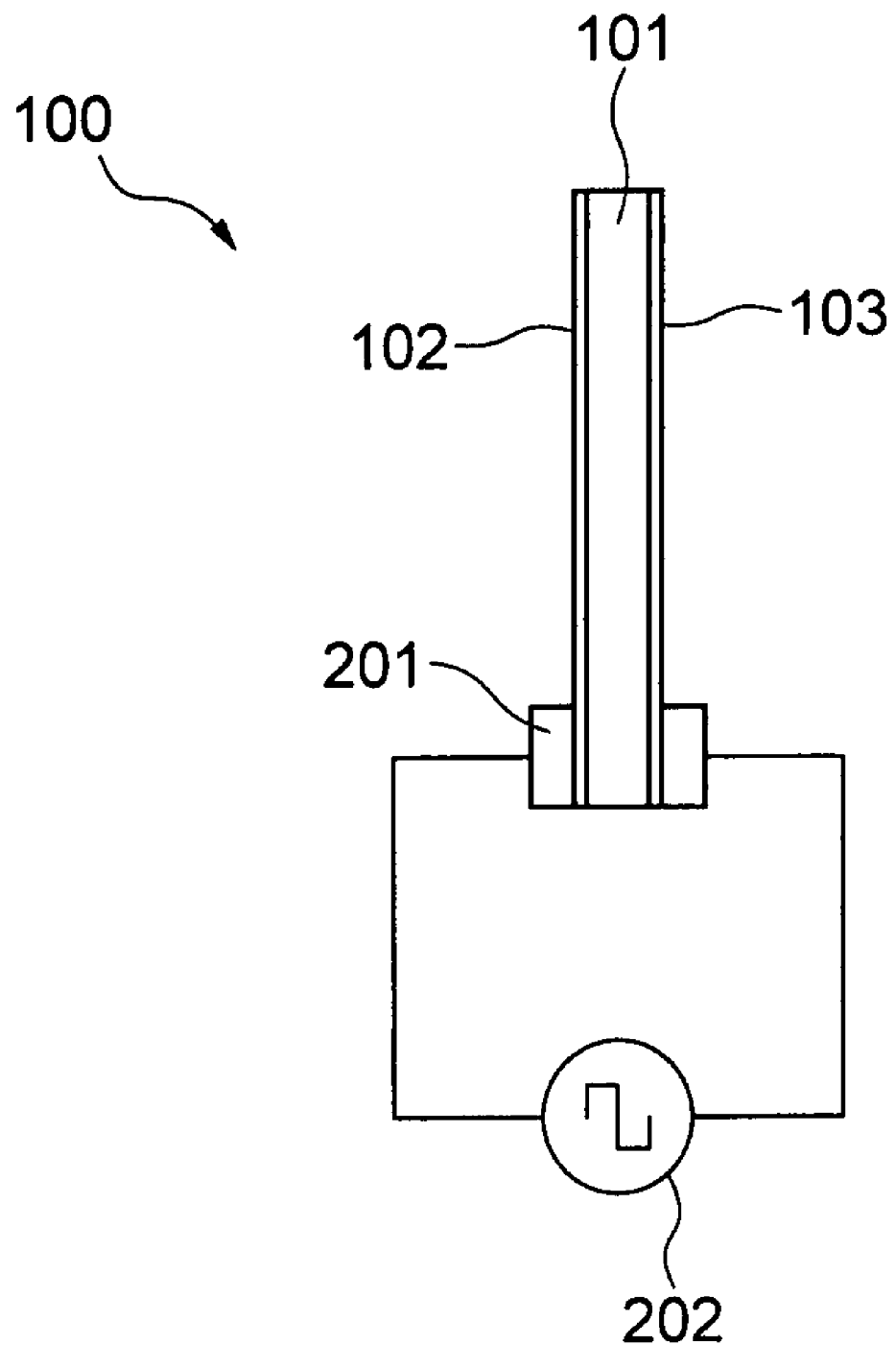
FIG. 1 is a diagram showing a cross-sectional structure of an ion conducting actuator according to an embodiment of the present invention.

An ion conducting actuator according to a first embodiment of the present invention, and a method for driving the ion conducting actuator will be described below. FIG. 1 is a diagram showing schematically an ion conducting actuator 100, a drive-voltage source 202, and electrical connections.

As shown in FIG. 1, the ion conducting actuator 100 is includes a facing electrode 102 and a facing electrode 103 which are formed by an electroless plating, on a surface of a substrate 101 made of a material such as an ion-exchange resin which includes ions and/or polar molecules which are movable by an electric field. Moreover, an output from the drive-voltage source 202 is applied to the facing electrode 102 and the facing electrode 103 via an electrode pad 201.

Figure 2A:
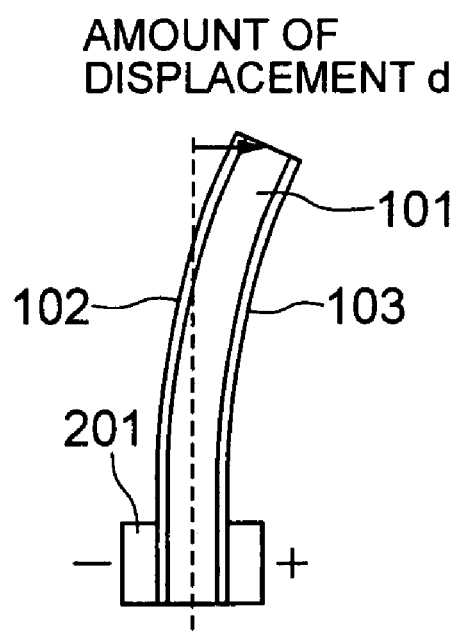
FIG. 2A is a diagram showing a deformation of the ion conducting actuator.
Figure 2B:
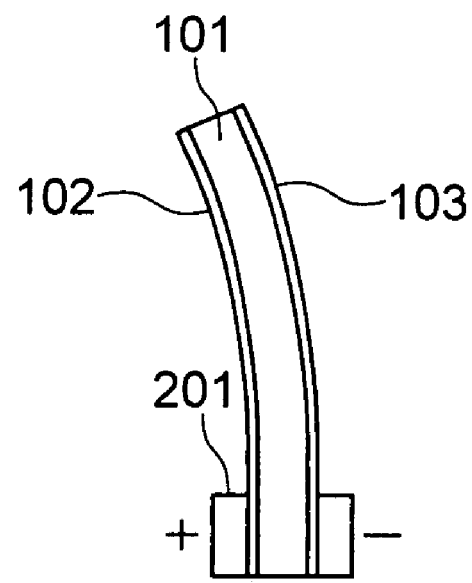
FIG. 2B is a diagram showing the deformation of the ion conducting actuator.

FIG. 2A and FIG. 2B are diagrams showing deformed states when a positive voltage and a negative voltage are applied to the facing electrode 102 and the facing electrode 103. As shown in FIG. 2A, in the diagram, when the negative voltage is applied to the facing electrode 102 formed at a left side of the ion conducting actuator 100, and the positive voltage is applied to the facing electrode 103 formed at a right side of the ion conducting actuator 100, due to an electric field generated by the voltage applied, positive ions and/or polar molecules in the substrate 101 move toward a negative pole. Accordingly, a negative pole side is swollen as compared to a positive pole side, and a front tip of the substrate 101 is deformed toward a right side in the diagram.

On the other hand, as shown in FIG. 2B, in the diagram, when the negative voltage is applied to the facing electrode 103 formed at the right side of the ion conducting actuator, and the positive voltage is applied to the facing electrode 102 formed at the left side of the ion conducting actuator, due to the electric field generated by the voltage applied, the positive ions or the polar molecules in the substrate 101 move toward a negative pole. Accordingly, the front tip of the substrate 101 is deformed toward a left side in the diagram.

In this manner, the ion conducting actuator 100 is an actuator in which a deformation of the substrate generated by the voltage applied is used. Here onward, an amount by which the front tip is deformed as shown in FIG. 2A is let to be an amount of displacement d (amount of deformation) of the ion conducting actuator 100 which shows an operation state as the actuator.

Moreover, the positive voltage and the negative voltage applied to the ion conducting actuator 100 are parameters which determine a direction of deformation. In the description, cases in which only the positive voltage or the negative voltage is applied are described. However, even when the voltage is applied reversing the positive voltage and the negative voltage in the description, the same effect is achieved.

Next, a drive mode including a concept of time of the ion conducting actuator 100 according to the first embodiment will be described by using FIG. 3A, FIG. 3B, FIG. 4A, and FIG. 4B.

Figure 3A:
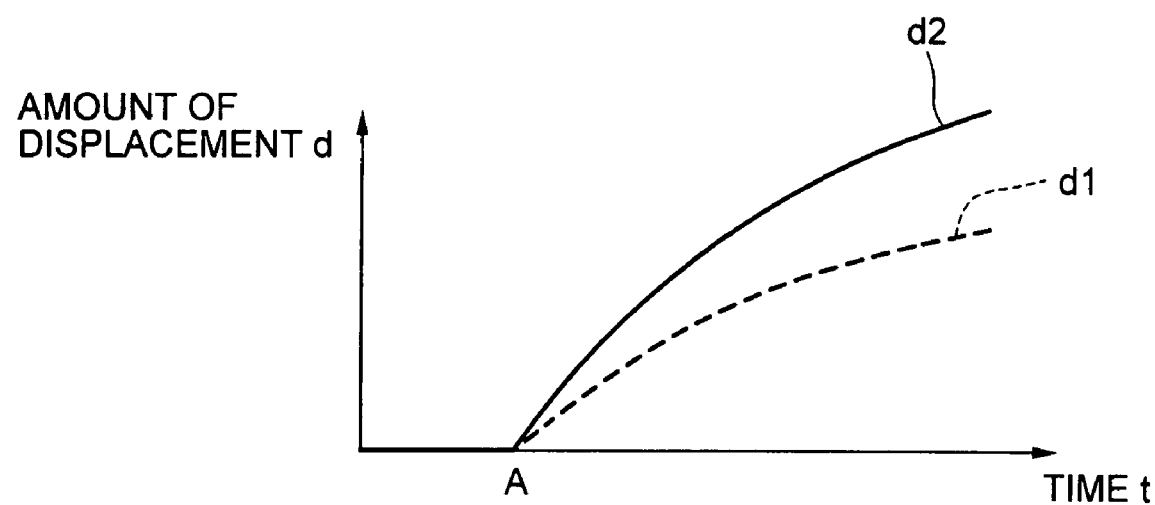
FIG. 3A is a diagram showing a relationship between a voltage applied and an amount of deformation.
Figure 3B:
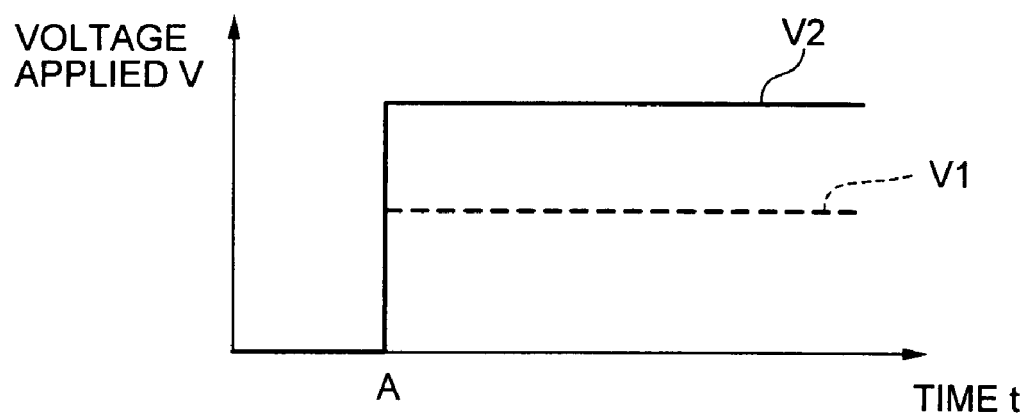
FIG. 3B is a diagram showing the relationship between the voltage applied and the amount of deformation.

FIG. 3B shows a drive voltage V applied to the ion conducting actuator for a comparatively shorter time. Moreover, FIG. 3A is a graph showing the amount of displacement d when the drive voltage V is applied. A scale of the graph is exaggerated for easing the description, and it does not show an actual scale as it is.

In FIG. 3A and FIG. 3B, a movement when a drive voltage V1 is applied is let to be an amount of displacement d1, and a movement when a drive voltage V2 is applied is let to be an amount of displacement d2.

As shown in FIG. 3B, after the drive voltage V1 (shown by dotted line) is applied (point A in the diagram) to the ion conducting actuator, the amount of displacement of the ion conducting actuator goes on increasing gradually. Moreover, higher the voltage V2 (shown by continuous line) applied as the drive voltage, a speed of deformation (response) becomes faster.

This, as mentioned above, because in the ion conducting actuator 100, since the movement of the ions or the polar molecules is let to be a drive source, and the ions or the polar molecules are moved, and a time to certain extent is necessary for a distribution of the ions and/or polar molecules to change. Moreover, this is because a traveling speed of the ions or the polar molecules is as fast as the high drive voltage.

Figure 4A:
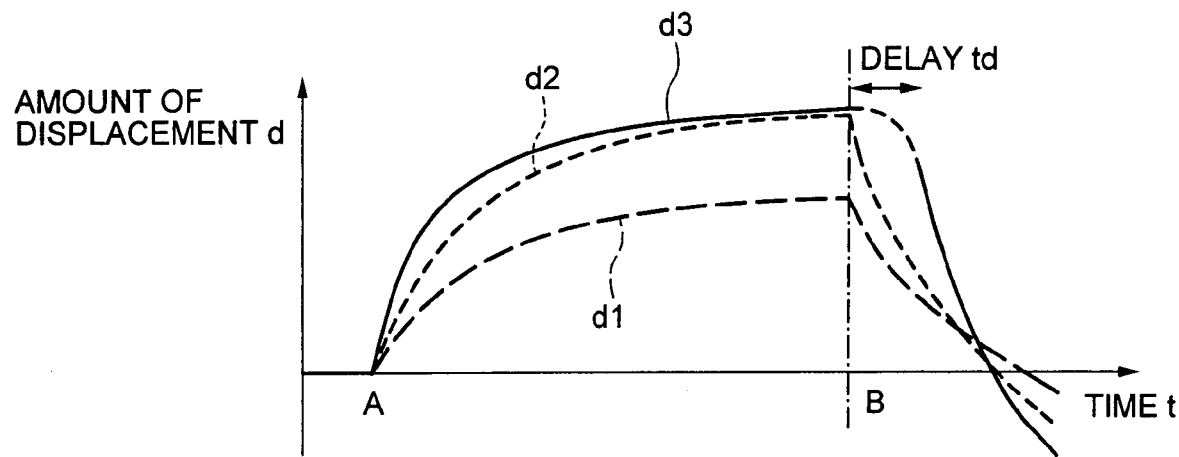
FIG. 4A is another diagram showing the relationship between the voltage applied and the amount of deformation.
Figure 4B:
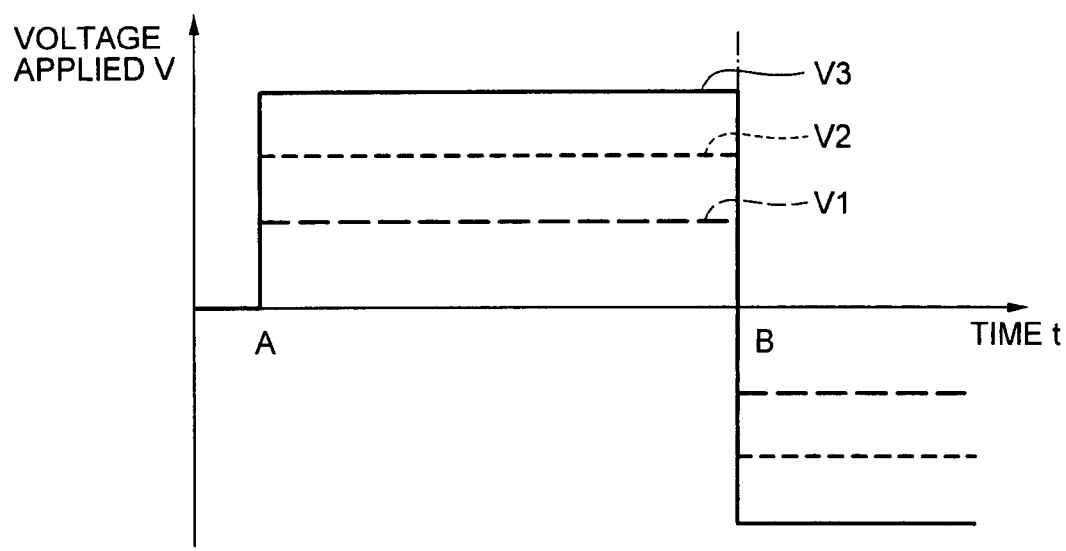
FIG. 4B is another diagram showing the relationship between the voltage applied and the amount of deformation.

Moreover, FIG. 4A and FIG. 4B are graphs in which the voltage applied to the ion conducting actuator for a comparatively longer time, and the amount of displacement, are shown.

In FIG. 4A and FIG. 4B, the movement when the drive voltage V1 is applied is let to be the amount of displacement d1, the movement when the drive voltage V2 is applied is let to be the amount of displacement d2, and a movement when a drive voltage V3 is applied is let to be an amount of displacement d3.

As shown in FIG. 4A and FIG. 4B, when a constant voltage is applied to the ion conducting actuator 100, a displacement speed of the ion conducting actuator 100 is decreased gradually. However, the amount of displacement is not saturated, and goes on increasing as a creep phenomenon.

Moreover, when the drive voltage V3 higher than necessary is applied, and then a reverse voltage is applied (point B in the diagram), although the deformation has started in a reverse direction, there is a delay td caused.

Figure 5A:
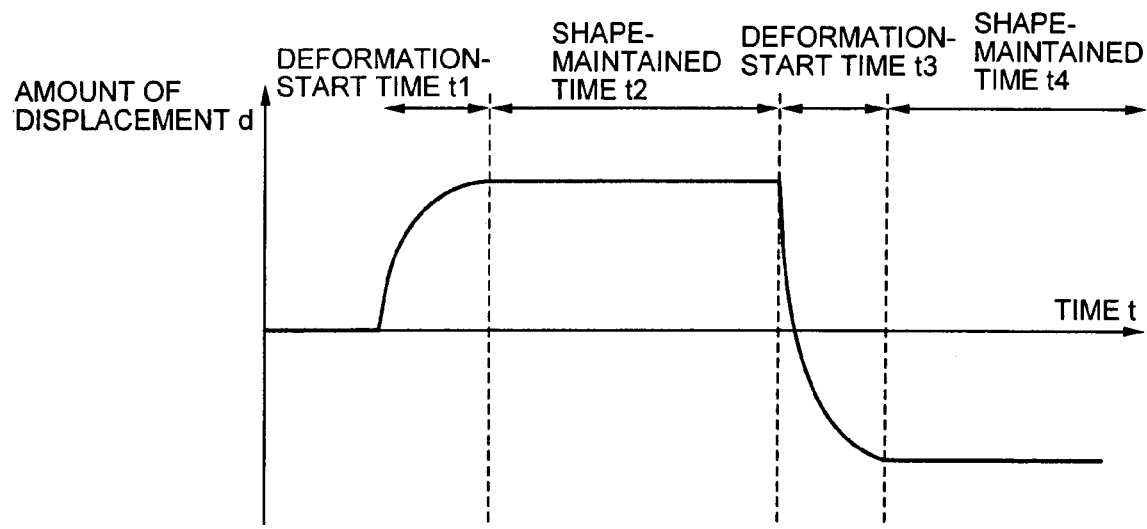
FIGS. 5A and 5B are diagrams showing the relationship between the voltage applied and the amount of deformation in a first embodiment.
Figure 5B:
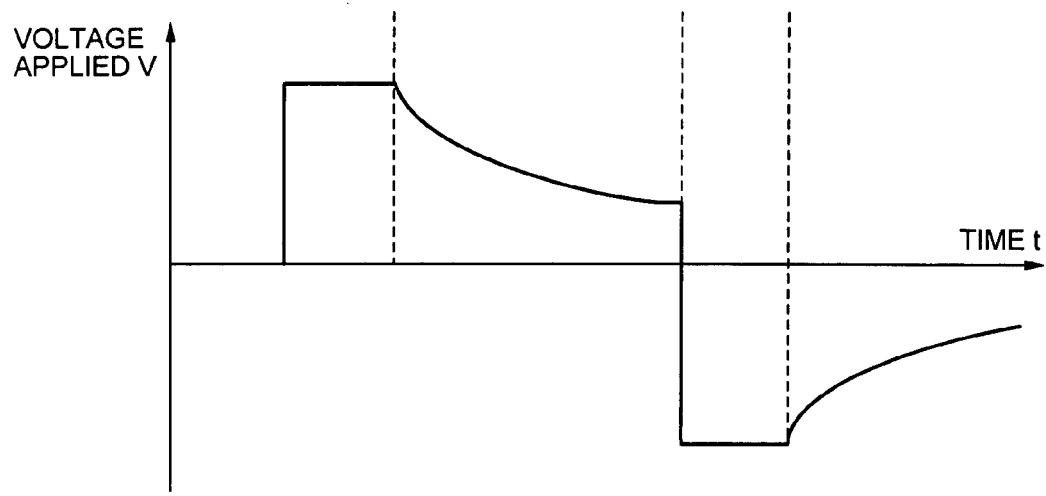

Considering such characteristics, a drive-voltage waveform of the ion conducting actuator 100 according to the first embodiment is shown in FIG. 5A and FIG. 5B.

As shown in FIG. 5A, a deformed state of the ion conducting actuator 100 will be described by dividing into shape-maintained times t2 and t4, and a deformation-start times t1 and t3 provided at an initial stage of the shape-maintained time.

The deformation-start times t1 and t3 are times of changing the ion conducting actuator 100 from an arbitrary state to a state of a desired shape. The shape-maintained times t2 and t4 are times of maintaining substantially the ion conducting actuator 100 in the state of the desired shape. In the method for driving the ion conducting actuator 100 according to the first embodiment, during the deformation-start times t1 and t3, a drive voltage which enables to achieve a required deformation speed (response) of the ion conducting actuator 100 is applied till a desired deformed state is achieved. The drive voltage at this time is constant.

After this, during the shape-maintained times t2 and t4, a drive voltage which decreases gradually is applied. The reason for applying such gradually decreasing drive voltage is that when the constant voltage is applied to the ion conducting actuator 100 as described above, the amount of displacement is not saturated, and goes on increasing gradually as the creep phenomenon.

In other words, this is because a voltage waveform which maintains substantially the desired deformed shape, or in still other words, a pressure waveform which supplies an energy equivalent to an energy required for holding a distribution of the ions or the polar molecules for substantially maintaining the deformed shape of the substrate, is a gradually decreasing waveform as shown in FIG. 5B.

As it has been described above, as to how the voltage goes on decreasing gradually differs according to characteristics of each ion conducting actuator. Therefore, the voltage waveform is optimized according to the requirement for each actuator.

In this manner, the voltage which is different during each of the deformation-start time t1 (t3) and the shape-maintained time t2 (t4) is applied. It is preferable to make the voltage during the shape-maintained time t2 (t4) to be lower than the voltage during the deformation-start time t1 (t3).

Here, maintaining substantially the desired deformed shape means a state which includes the following two states (1) and (2).
(1) a state of maintaining the desired shape in a free state, when there is no external force acting on the ion conducting actuator 100, and
(2) a state of maintaining the desired shape with the ion conducting actuator 100 making a contact with an abutting member such as a stopper.

For example, to maintain substantially the desired deformed state means to maintain a deformed state which is suitable for a mode of using the ion conducting actuator 100. For example, in a case of a binary driving for driving ON-OFF a switch of the ion conducting actuator 100, a case in which the desired amount of deformation is +x mm or more and −x mm or more can be taken into consideration.

In this case, a fact that the amount of deformation of the ion conducting actuator 100 is displaced by +x mm or more and by −x mm or more, means that the deformed state is maintained substantially.

Moreover, in a case of using the ion conducting actuator 100 for an alignment of a stage, a case in which the desired amount of deformation is with a position accuracy of ±δmm at x mm step can be taken into consideration. In this case, a fact that the amount of deformation of the ion conducting actuator 100 is accommodated in ±δ mm with respect to the desired amount of deformation means that the deformed state is maintained substantially.

As it has been mentioned above, by applying the drive voltage as shown in FIG. 5B, with the required response secured, the deformed state of the ion conducting actuator 100 is maintained by a minimum energy, and a voltage higher than necessary voltage is not applied. Therefore, there is no delay in a deformation thereafter.

Second Embodiment

Figure 6:
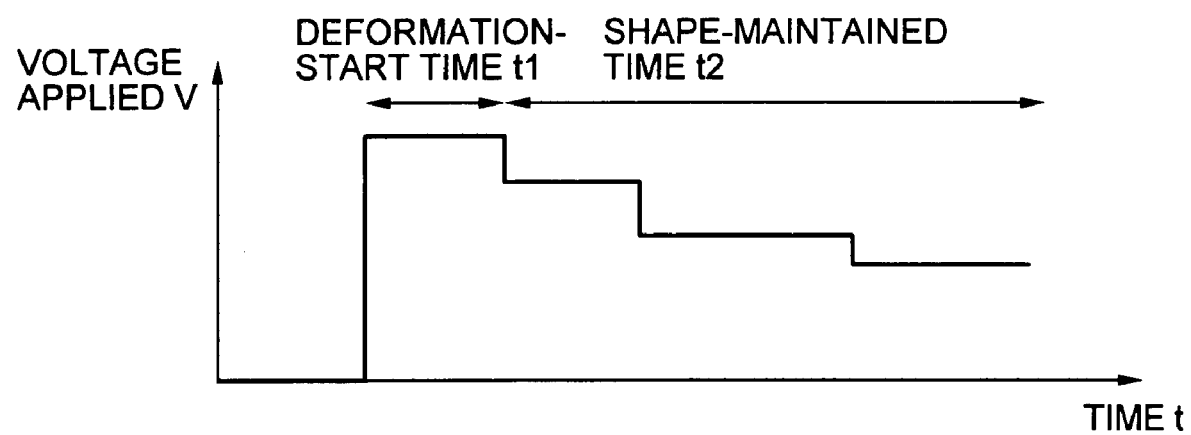
FIG. 6 is a diagram showing the relationship between the voltage applied and the amount of deformation in a second embodiment.

Next, another method for driving the ion conducting actuator 100 according to a second embodiment of the present invention will be described below. FIG. 6 shows a voltage waveform in the second embodiment.

As shown in FIG. 6, a voltage decreasing in stages may be applied as a voltage to be applied to the ion conducting actuator 100 during the shape-maintained time t2. When such a drive-voltage waveform is applied, generally, an accuracy of maintaining the ion conducting actuator 100 to the desired amount of displacement is somewhat decreased, than the decreasing drive-voltage waveform shown in FIG. 5A and FIG. 5B, but a driving-circuit structure becomes simple.

Third Embodiment

Figure 7:
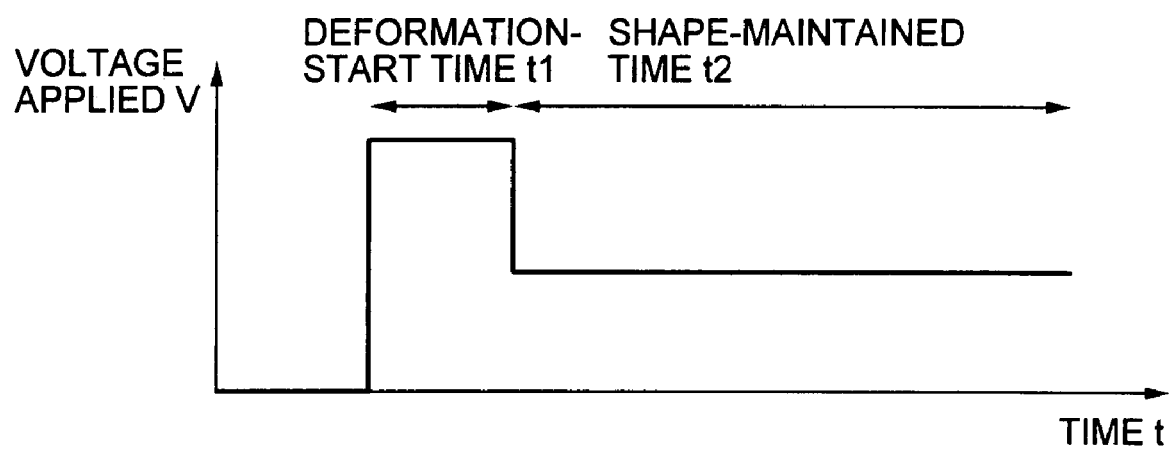
FIG. 7 is a diagram showing the relationship between the voltage applied and the amount of deformation in a third embodiment.

Next, a method for driving the ion conducting actuator 100 according to a third embodiment of the present invention will be described below. FIG. 7 shows a voltage waveform in the third embodiment.

As shown in FIG. 7, a constant voltage lower than the drive voltage applied during the deformation-start time t1 may be applied as the voltage to be applied to the ion conducting actuator 100 during the shape-maintained time t2. When such a drive-voltage waveform is applied, generally, the accuracy of maintaining the ion conducting actuator 100 to the desired amount of displacement is somewhat decreased, than the diminishing (decreasing) drive-voltage waveform and the drive-voltage waveform decreasing in stages shown in FIG. 5 and FIG. 6, but the driving-circuit becomes simple.

Fourth Embodiment

Next, a fourth embodiment will be described below. Firstly, a relationship between the drive voltage and a standard voltage will be described. Generally, the standard voltage exists in the ion conducting actuator 100 according to the present invention. The 'standard voltage' means an appropriate voltage at which the characteristics of the ion conducting actuator are not declined, based on an endurance test.

The standard voltage is a voltage which is determined by a plastic deformation of the substrate and a chemical change occurred in the ion conducting actuator. For example, the standard voltage is a voltage at which the decline in deformation characteristics is accommodated in a fixed range (for example 80%) irrespective of the time for which the drive voltage is applied.

Supposedly, when a voltage higher than the standard voltage is applied to the ion conducting actuator, the deformation characteristics are declined temporarily or permanently. However, there exists a condition which has no effect on the characteristics according to the voltage value and the time for which the voltage is applied, even when the voltage same as or higher than the standard voltage is applied.

To give an example based on experiment carried out upon zealous research by inventors of the present invention, a voltage of ±8 V was applied for 500 msec to an ion conducting actuator of the standard voltage ±2 V, and then when the voltage was lowered below the standard voltage, the decline in characteristics did not occur.

Figure 8:
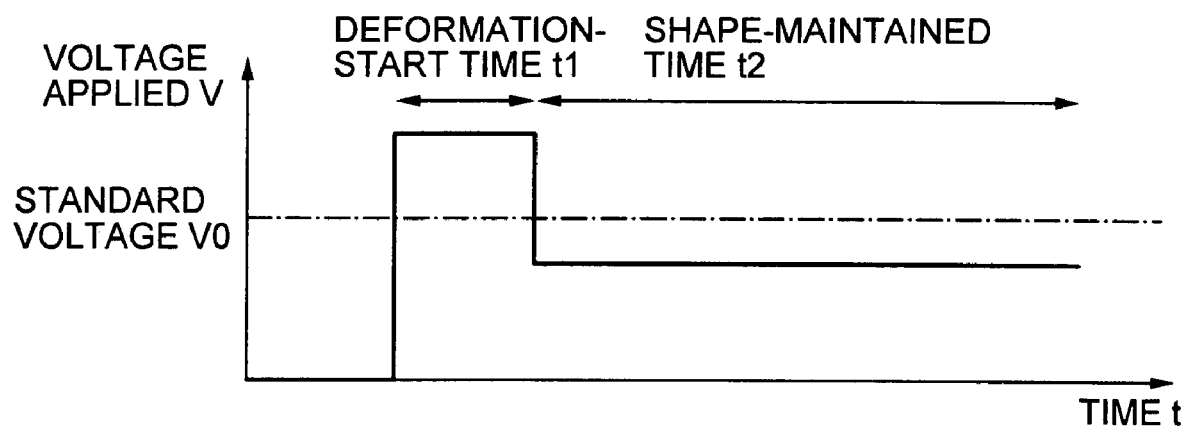
FIG. 8 is a diagram showing the relationship between the voltage applied and the amount of deformation in a fourth embodiment.

Considering these facts, as shown in FIG. 8, a voltage same as a standard voltage V0 or more is applied for the deformation-start time t1 with the condition which does not have an effect on the characteristics of the ion conducting actuator. Thereafter, a voltage same as the standard voltage V0 or less is applied for the shape-maintained time t2. Accordingly, it is possible to improve the deformation speed (response) of the ion conducting actuator and to drive the ion conducting actuator without a decline in the deformation characteristics.

In this patent application, the deformation-start time is defined as a time of changing the ion conducting actuator from an arbitrary state to the desired deformed state. Moreover, the shape-maintained time is defined as a time for which the desired shape state is maintained substantially.

Moreover, the drive voltage applied during the deformation-start time is let to be a constant voltage. Furthermore, the drive voltage applied during the shape-maintained time has been described as the voltage decreasing gradually, the voltage decreasing in stages, and the constant voltage lower than the drive voltage applied during the deformation-start time.

However, without restricting to these, the deformation-start time and the shape-maintained time, and the voltage applied are not necessarily required to be matching. For example, as shown in FIG. 9B, at least a part of the voltage to be applied during the deformation-start time t1 is made higher than the standard voltage V0. Further, the drive voltage to be applied during the deformation-start time t1 may be let to be not constant.

Figure 9A:
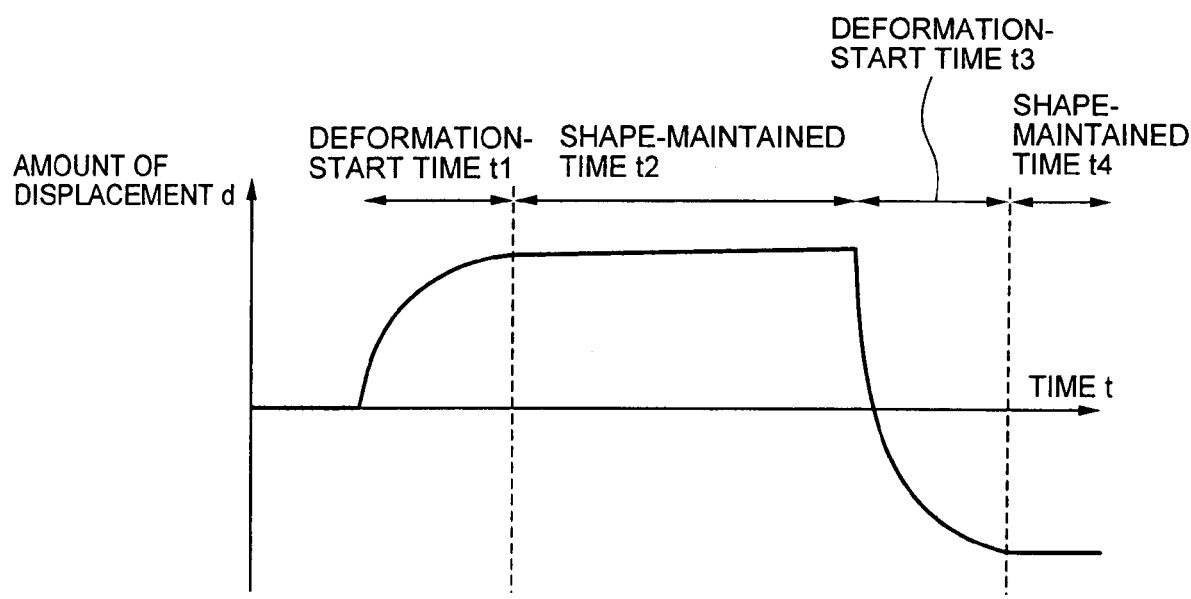
FIG. 9A is a diagram showing the relationship between the voltage applied and the amount of deformation in a fifth embodiment.
Figure 9B:
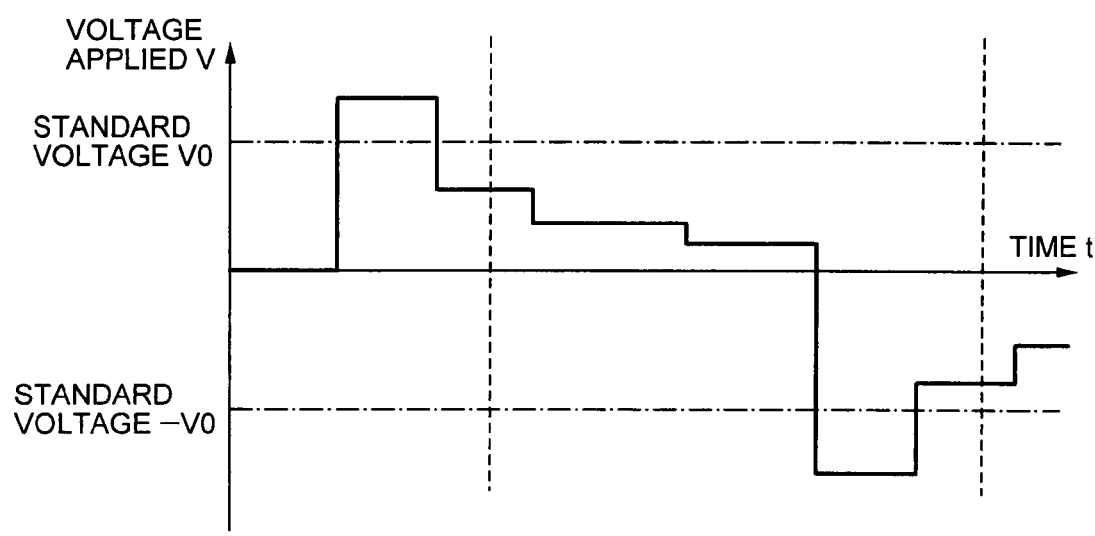
FIG. 9B is a diagram showing the relationship between the voltage applied and the amount of deformation in the fifth embodiment.

Accordingly, as shown in FIG. 9A, it is possible to achieve the high-speed response without an occurrence of a delay time.

As it has been described above, the method for driving the ion conducting actuator according to the present invention is useful when a high response is necessary.

According to the present invention, an effect is shown that it is possible to provide a method for driving the ion conducting actuator achieving the high-speed response, and an ion conducting actuator which can be driven at a high speed by this method for driving.

What is claimed is:

1. A method for driving an ion conducting actuator which includes a substrate made of a polymer material containing ions and/or polar molecules which are movable according to an electric field, and facing electrodes for generating the electric field, on a surface of the substrate, and which deforms a shape of the substrate to a desired shape by distributing unevenly the ions or the polar molecules in the substrate by applying a voltage to the facing electrodes, and maintains a deformed shape of the substrate for a predetermined time, comprising:

applying to the ion conducting actuator a drive voltage which differs during a shape-maintained time and during a deformation-start time, wherein the shape-maintained time for which a shape of the substrate is maintained substantially and the deformation-start time which is before the shape-maintained time, and during which, the shape of the substrate is deformed from an arbitrary shape to a desired shape, together form a deformation state of the ion conducting actuator.

2. The method for driving the ion conducting actuator according to claim 1, wherein the drive voltage applied during the shape-maintained time is a voltage which supplies an energy equivalent to an energy required for holding a distribution of the ions or the polar molecules, which substantially maintain the deformed shape of the substrate.

3. The method for driving the ion conducting actuator according to claim 1, wherein the drive voltage applied during the shape-maintained time decreases gradually along with time.

4. The method for driving the ion conducting actuator according to claim 1, wherein the drive voltage applied during the shape-maintained time decreases in stages, along with time.

5. The method for driving the ion conducting actuator according to claim 1, wherein at least a part of the drive voltage applied during the deformation-start time is higher than a standard voltage.

6. The method for driving the ion conducting actuator according to claim 5, wherein the drive voltage applied during the deformation-start time is not constant.

7. The method for driving the ion conducting actuator according to claim 5, wherein the drive voltage applied during the deformation-start time is constant.

* * * * *